Patented July 16, 1935

2,008,435

UNITED STATES PATENT OFFICE 2,008,435

PHOTOGRAPHIC FILM AND A LAMINATED PROTECTIVE COATING THEREFOR

Mary Helen Caruso, Woodside, N. Y.

No Drawing. Application September 8, 1933, Serial No. 688,626

5 Claims. (Cl. 91—69)

This invention relates to the art of fire proofing materials and has particular reference to a non-inflammable coating composition for rendering materials practically non-combustible when subjected to heat or flame.

The invention more specifically has in view a non-inflammable coating composition for celluloid and articles produced thereof, such as motion picture films and photographic plates or films, which coating composition not only renders the same non-combustible but in addition adds to the life of the film by strengthening the same and this without in any way interfering with the proper functioning of the film or affecting the picture or sound track of the film.

The invention also contemplates a coating for the indicated purpose which emits a non-inflammable gas at high temperatures sufficient in volume to counteract any inflammable gases given off by the film or material by acting to exclude therefrom the oxygen necessary to support combustion thereof.

Attempts have been made to fireproof celluloid articles by the application thereto of a coating of a single homogeneous layer of a fire resisting compound but such coatings or compounds have not proved entirely satisfactory, particularly in connection with the celluloid films for the reason that the coating, in addition to providing fire resisting qualities, must also possess the qualities of flexibility, and afford a smooth, hardened outer surface, and be resistant to air and moisture.

In order to overcome the above noted objections, incident to homogeneous fire resisting coatings, the present invention embodies the employment of successively applied coatings or laminations of different compositions which coatings combine to produce a non-inflammable surfacing having the requisite degree of flexibility, presenting a smooth but hardened outer surface while rendering it resistant to air and moisture.

In carrying out the invention, use is made of successive layers or coatings of a non-combustible fire resistant composition or substance, a non-combustible air and moisture excluding composition or substance and a smooth hard outer composition or substance.

The non-combustible fire resisting composition or substance, may primarily consist of a mineral chloride such as aluminum chloride, calcium chloride, and magnesium chloride or a combination of such chlorides. Very satisfactory results have been obtained by the use of 16 parts by weight of aluminum chloride; 30 parts by weight of calcium chloride and 20 parts by weight of magnesium chloride. These may be dissolved in 50 parts by weight of water and the resulting solution dissolved in an adhesive body such as gelatin glue or gelatin glue combined with glycerin. An adhesive body found to be satisfactory for the purpose may consist of 25 parts by weight of gelatin glue and 100 parts by weight of glycerin dissolved in 400 parts by weight of water.

The air and moisture resisting composition or substance may consist of waterproof animal glue such as obtained by combining formaldehyde or paraformaldehyde with gelatin glue. The said composition or substance may also be obtained by superimposing a solution of formaldehyde or paraformaldehyde upon a coating of gelatin glue which coacts therewith to produce a fixing of the glue. This may be accomplished by coating the fire resisting coating or composition with a solution obtained by dissolving 10 parts by weight of gelatin glue and 9 parts by weight of a solvent such as diethylene glycol ethyl ether or "Carbitol" in 225 parts by weight of water and after such coating is dry, to superimpose thereupon a coating of one part by weight of 40% formaldehyde dissolved in 90 parts by weight of water after heated to approximately a temperature of 100° to 110° F.

The outermost surfacing composition or substance which produces a smooth hardened outer surface, is primarily a pure pyroxylin such as celloidin Schering, 5 parts by weight of which is dissolved in a suitable solvent, for example, in 100 parts by weight of methylethyl ketone to which is added approximately 3 drops of castor oil as a softening agent. This makes for a very thin surfacing coat upon evaporation of the solvent content.

In applying the coatings, the non-combustible fire resisting composition or substance dissolved in the adhesive base, is allowed to stand for several hours to permit the escape of air bubbles. Any foam which may appear is removed by filter paper or other means and the celluloid article such as a film is passed slowly through the solution heated to a temperature of approximately 110° to 120° F. and without disturbing the mixture so as to avoid the entrapment of air bubbles after which the film is allowed to dry at a temperature of approximately 85° to 90° F. The film is then coated with the air and moisture resisting composition or substance. For this purpose the waterproof solution of gelatin glue and carbitol is heated to approximately 130° F. and freed of any foam which may appear upon the top by means of filter paper and when at a temperature of approximately 115° to 120° F. the film is slowly passed therethrough after which it is allowed to set at a temperature of approximately 80° F. While still in a tacky state, the film is quickly passed through the formaldehyde solution and allowed to set at approximately 80° F.

The outer surfacing composition or substance, is prepared in advance and allowed to stand for approximately 12 hours after which the article or film with the previous coating applied, while still in a tacky condition, is passed therethrough so that said surfacing composition forms an extremely thin coating after evaporation of the solvent content, thus producing a smooth hard surface finish.

The coatings or laminations when thus applied, firmly adhere to each other and to the celluloid base to provide a substantially permanent covering which is non-inflammable and practically non-combustible at all temperatures, especially when subjected to heat or flame, and which is sufficiently flexible so that when applied to a motion picture film, it does not interfere with the free reeling or unreeling of the film and the passage of the film through a projecting machine, while avoiding the absorption of moisture or air so that the film is transparent and hence cannot become clouded by absorbing moisture and in addition thereto presents a smooth hard outer surface.

What is claimed is:

1. A photographic film or the like and a laminated protective coating therefor, including a fire resisting layer, including aluminum chloride, magnesium chloride and calcium chloride, an air and moisture excluding layer, including a gelatin glue fixed by a solution of formaldehyde and an outer layer presenting a smooth hard surface including pyroxylin and a softening agent.

2. A photographic film or the like and a laminated protective coating therefor, including a fire resisting layer obtained by dissolving aluminum chloride, calcium chloride and magnesium chloride in a slow drying adhesive including gelatin glue and glycerin, an air and moisture excluding layer including gelatin glue disssolved in a solvent and fixed by a solution of formaldehyde and an outer layer presenting a smooth hard surface including pyroxylin and a softening agent.

3. A photographic film or the like and a laminated protecting coating therefor including a fire resistant lamination applied to the surface of the film and consisting of a fire resistant material dissolved in an adhesive, an air and moisture excluding lamination applied to the first lamination and including a glue body and a fixing agent, and a lamination applied to the outer surface of the second lamination presenting a smooth hard surface including pyroxylin and a softening agent.

4. A photographic film or the like and a laminated protecting coating therefor including a fire resistant lamination applied to the surface of the film and consisting of a mineral chloride dissolved in an adhesive, an air and moisture excluding lamination applied to the first lamination and including a glue body and a fixing agent, and a lamination applied to the outer surface of the second lamination including pyroxylin dissolved in a solvent and castor oil as a softening agent.

5. A photographic film or the like and a laminated protective coating therefor including an inner fire resistant lamination adhesively carried by the surface of the film consisting of a mineral chloride dissolved in an adhesive combined with glycerin, an intermediate lamination carried by the outer surface of the inner lamination and consisting of a glue body and a fixing agent and an outer lamination carried by the outer surface of the intermediate lamination including pyroxylin and a softening agent.

MARY HELEN CARUSO.